United States Patent [19]

Martin

[11] 4,092,516
[45] May 30, 1978

[54] SEALING DEVICE FOR A VACUUM ENCLOSURE

[75] Inventor: Philippe Martin, Orsay, France

[73] Assignees: Commissariat a l'Energie Atomique, Paris Cedex; Soudure Autogene Francaise, Paris, both of France

[21] Appl. No.: 790,883

[22] Filed: Apr. 26, 1977

[30] Foreign Application Priority Data

Apr. 28, 1976 France .................... 76 12572

[51] Int. Cl.² .................... B23K 9/00
[52] U.S. Cl. .................... 219/121 EB
[58] Field of Search ........... 219/72, 121 EB, 121 EM

[56] References Cited

U.S. PATENT DOCUMENTS

| 3,485,998 | 12/1969 | Gerard | 219/72 |
| 3,806,693 | 4/1974 | Mill | 219/121 |

Primary Examiner—J. V. Truhe
Assistant Examiner—Fred E. Bell
Attorney, Agent, or Firm—Cameron, Kerkam, Sutton, Stowell & Stowell

[57] ABSTRACT

A vacuum enclosure rests on two parts to be seam-welded by the electron-beam welding technique and surrounds a support for an electron gun. The support is made up of two separable elements, the first element being constituted by a frame applied in vacuum-tight manner against the parts to be welded by means of a seal fitted on one face, the other face being applied against a flange of the second element which forms a bell-housing and is applied against the frame.

7 Claims, 4 Drawing Figures

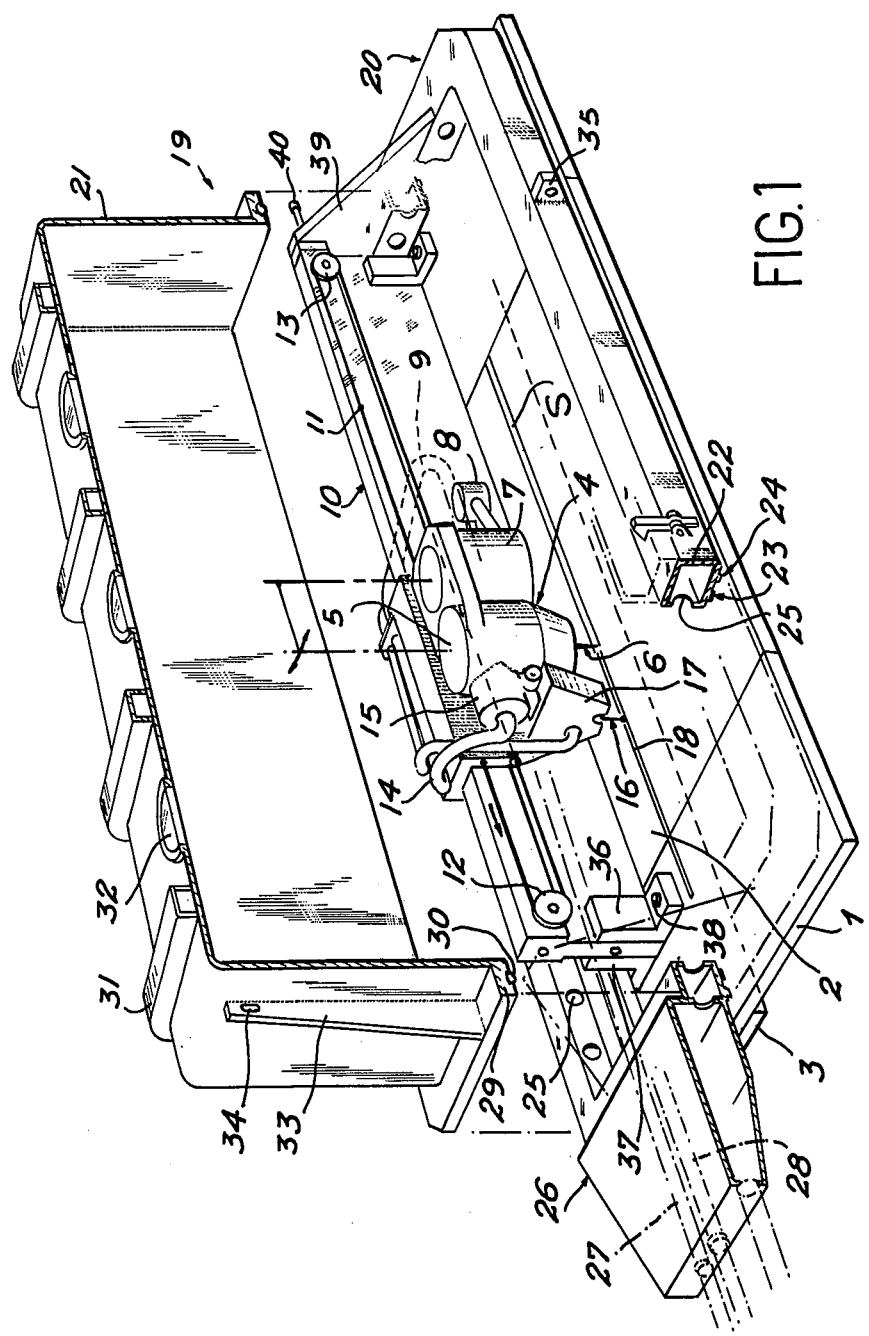

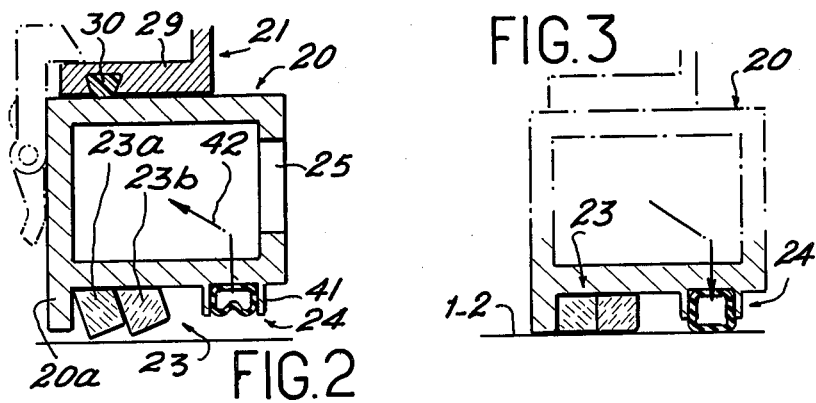
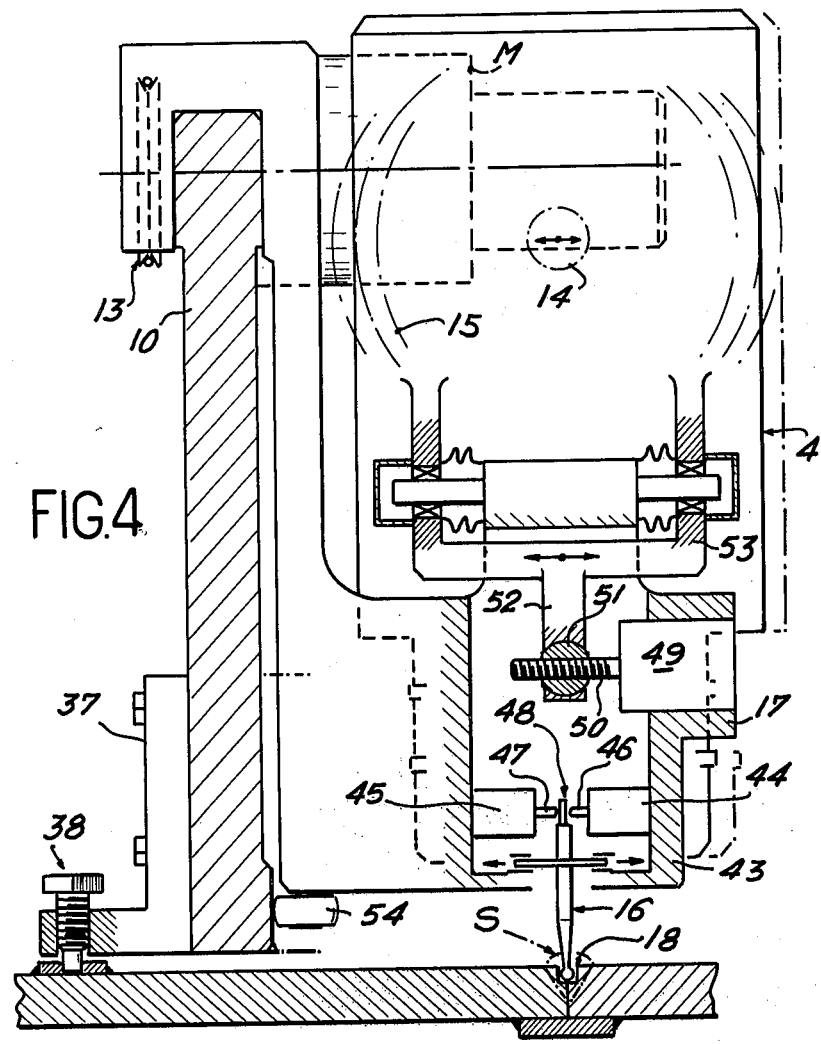

SEALING DEVICE FOR A VACUUM ENCLOSURE

This invention relates to a sealing device for a vacuum enclosure which is primarily applicable to the welding of parts by the electron beam process.

Electron-beam welding is a well-known technique which consists of bombardment with a beam of electrons. In a particular application, this technique is employed on construction sites for the welding of massive parts. For this purpose the equipment comprises a support on which the electron gun is subjected to the necessary movement of disdisplacement during the welding operation and an enclosure in which a vacuum is intended to be created around the electron gun. There is no rigid connection between the support and the enclosure which are thus applied independently against the parts to be welded. The surfaces on which the support rests during the welding operation are machined beforehand, the surfaces to be welded of the parts themselves being intended to serve as references. The electron gun is displaced within the enclosure by means of an electric motor placed either inside or outside said enclosure and supplied through this latter by means of flexible cables or by means of transmission rods associated with knuckle joints or universal joints. A notable advantage of these arrangements lies in the fact that the parts need not be completely confined within the enclosure. This advantage is highly appreciable when it proves necessary to weld parts having large dimensions which would otherwise entail the need for confinement enclosures of prohibitive overall size. A design of this type is described and claimed in particular in U.S. Pat. No. 3.463.899 filed Apr. 6, 1967.

This invention is concerned with an improvement in the arrangements recalled in the foregoing, thus resulting in better design and construction as well as easier practical application of the welding device. At the same time, steps have been taken to ensure that the electron gun support and the vacuum enclosure are maintained applied against the parts to be welded, that the displacement of the electron gun within said enclosure is controlled together with the support and with respect to this latter, that a positioning feeler is applied against at least one surface which is machined on the parts to be welded in a direction parallel to the plane of the welded joint to be formed.

In accordance with the present invention, the enclosure which surrounds the electron gun support is made up of two elements, the first element being constituted by a frame fitted on one face with seals for providing a vacuum-tight seal as a result of application against the parts to be welded whilst the other face of said frame is applied against a flange which is formed on the second element, said second element being intended to constitute a bell-housing which is applied against said frame.

The above-mentioned arrangement in which the vacuum enclosure is made up of two separable elements offers a feature of primary interest by providing the frame with all the vacuum-tight penetrations which are necessary for the operation of the electron gun. It is thus possible in particular to pass through the frame the electric cables for supplying the drive motor which carries out the displacement of the electron gun on its support, the high and low voltage supplies to the electron gun, the fluid ducts and especially the pump discharge tubes for producing a vacuum within the enclosure and within the casing of the electron gun. In consequence, removal of the upper element or bell-housing can be performed without touching the electron gun itself. This makes it possible to gain access to the interior of the vacuum enclosure, to uncover within said enclosure both the electron gun and all the important adjusting means which are associated with this latter without any need to disconnect the electric lead-in bushings or the fluid ducts which pass through the frame. All the operations which are essential to preparation of the welding process and especially the adjustment of the electron gun trajectory can thus be performed in the external atmosphere. The bell-housing can then be placed in position on the frame and a vacuum created within the enclosure before performing the welding operation proper.

Advantageously and in accordance with a particular feature of the invention, the frame of the vacuum enclosure is provided with grappling members for simultaneous handling of the enclosure and of the electron gun suport, said support being rigidly fixed to the frame by locking means which are intended to be released prior to the welding operation in order to ensure that the trajectory of the electron gun is not modified by any possible deformations of the enclosure walls, especially at the time of evacuation of said enclosure.

Preferably, the frame is constituted by a hollow structure provided in the internal surface which is directed towards the interior of the enclosure with a duct for pumping the internal atmosphere of said enclosure when a primary vacuum is being created within this latter.

The bell-housing which is applied against the frame has a smooth internal surface which facilitates cleaning and in particular the removal of any metal deposits which may have condensed on the bell-housing wall during the welding operation since such deposits are liable to be the cause of substantial and disadvantageous outgassing.

In accordance with a further distinctive feature of the device under consideration, the electron gun which is mounted within the vacuum enclosure is associated with pumping means for creating a secondary vacuum within the electron gun, said pumping means being intended to discharge into the enclosure or into the evacuation conductance which is placed in a primary vacuum or alternatively into the external atmosphere. Depending on requirements, the pumping means associated with the electron gun consist of a diffusion pump, a turbumolecular pump or hybrid pump in which a turbomolecular pump is associated with a Holweck pump.

Finally and in accordance with yet another distinctive feature, the seals fitted in the surface of the frame which is applied against the parts to be welded are constituted by at least two concentric seals consisting of an outer seal formed of flexible material and capable of compression under the weight of the vacuum enclosure and of an inflatable inner seal under low pressure which is intended to bear on the parts to be welded and to absorb the surface defects of these latter.

Further distinctive features of a welding device constructed in accordance with the arrangements of the present invention will become apparent from the following description of one exemplified embodiment which is given by way of indication without any limitation being implied, reference being made to the accompanying drawings, wherein:

FIG. 1 is a diagrammatic part-sectional view in perspective which illustrates the welding device under consideration and shows in particular the structure of the electron-gun support and of the vacuum enclosure which surrounds said support and is made up of two elements;

FIGS. 2 and 3 are detail views to a larger scale in cross-section along the plane represented diagrammatically by the line A—A in FIG. 1 and illustrate the frame which constitutes one of the two elements of the vacuum enclosure;

FIG. 4 is a transverse sectional view to a larger scale which illustrates the electron-gun support and the feeler device which is associated with this latter.

The machine which is illustrated in FIG. 1 is primarily intended to make an accurate seam weld, in this case between two adjacent metallic plates 1 and 2 respectively, said plates being abuttingly applied against each other and each provided along the bottom face with a back-plate 3 placed beneath the joint line which is formed between these two parts and in which a seam-weld fillet S is intended to be made. Said weld fillet is obtained by means of a welding head which is generally designated by the reference 4 and comprises in particular an electron gun 5 of a type known per se which delivers an electron beam 6 and the displacement of which along the weld line serves to form the desired seam-weld fillet S. The electron gun 5 is associated with a pump 7 of the turbomolecular or hybrid type for producing within the electron-gun casing the secondary vacuum which is necessary for the production of the electron beam. Said pump 7 discharges either into a conductance 8 or directly into the primary vacuum of the enclosure 19 which surrounds the electron gun and the constructional detail of which will be described hereinafter. A flexible cable 9 incorporates all the electric leads for high and low voltage supplies to the electron gun 5. Displacement of the welding head 4 in a direction parallel to the joint line is carried out by causing the electron gun to rest on a support 10 of substantial length along which the movement of the head is produced by means of a chain or belt 11 passed around two pulleys 12 and 13 respectively and provided at the ends of said support. The chain or belt 11 is controlled and driven by a motor M (as shown in FIG. 4) which is mounted at the end of the support 10 and adapted to drive a pinion or one of the pulleys 12 or 13. A supply cable 14 is connected to the electron gun 15 in order to supply high voltage to this latter.

In accordance with one advantageous arrangement, the welding head 4 is capable of moving with respect to the support 10, not only in the longitudinal direction of this latter in order to follow the line of the seam weld S to be formed but also with a slight transverse displacement in order to take into account any possible variations affecting the linearity of the joint plane between the plates 1 and 2. To this end, the welding head comprises a feeler 16 carried by a position-control device 17 which is associated with the head 4 and which will hereinafter be described in greater detail with reference to FIG. 3. In accordance with an arrangement which was already contemplated in the main patent, said feeler 16 is designed in particular to follow a reference line 18 which is exactly parallel to the line of the seam weld to be formed and is machined in one of the plates 1 or 2.

In order to carry out the welding of the plates 1 and 2 by means of the electron beam 6, the welding head 4 must be placed in a suitable primary vacuum. The parts 1 and 2 serve to support an enclosure 19 and are thus intended to surround the welding head and that zone of the parts in which the welding operation is to be performed. The back-plate 3 which has previously been fixed beneath said parts ensures the necessary degree of vacuum-tightness on the opposite side.

The removable enclosure 19 is made up of two elements 20 and 21 respectively which can be separated from each other and are designed to be placed in position independently. The first element 20 is designed in the form of a frame having a rectangular profile and formed by a hollow beam 22. The bottom face of said beam which is applied against the plates 1 and 2 is fitted with seals which follow the profile of the beam and are designated respectively by the references 23 and 24. Orifices 25 are also formed in that surface of the beam 22 which is directed towards the interior of the enclosure which surrounds the welding zone. Said orifices serve to draw the internal atmosphere through the beam in order to create a vacuum within the enclosure once the two elements of this latter have been fitted in position. The frame beam 22 is fitted at one end with a protective casing 26 which is rigidly fixed to the beam and surrounds a series of cables or pipes such as those designated by the references 27 and 28. The cables serve to establish an electrical connection with the supply cables 9 and 15 located within the enclosure whilst the pipes are provided for the purpose of pumping the enclosure once the frame 20 has been covered by the second element 21 after adjustment of the electron gun and control of the feeler.

The second element 21 of the enclosure 19 is advantageously designed in the form of a bell-housing having a metallic wall of sufficient thickness to provide a suitable degree of protection. Said bell-housing is provided at its lower end with a flat flange 29 fitted with at least one seal 30 which is intended to be applied against the top surface of the beam 22 in order to ensure continuity of vacuum-tightness. The bell-housing 21 is further provided with lateral reinforcements 31 in order to be capable of affording resistance to the external pressure when a vacuum is produced within its internal region, and also with windows 22 which make it possible in particular to follow the displacements of the welding head 4 within the enclosure. Provision is made on the end faces of the bell-housing 21 for welded plates such as the plate 33 in which are formed holes 34 for fastening hooks so that a handling unit (not shown in the drawings) can lift the bell-housing 21 and separate this latter from the frame 20 in order to gain access to the welding head 4 and to the components of the machine which are located within the enclosure during operation. Thus the necessary adjustments and final settings can be carried out without any need to produce action on the frame 20 itself and in particular without having to disconnect the cables and pipes 27 and 28 from the casing 26.

The frame 20 is preferably provided with handling lugs 35 in order to permit removal at the end of welding operations; withdrawal of said frame can be carried out at the same time as the support 10 and the welding head 4. To this end, said support is associated with two right-angled positioning brackets 36 and 37 which are normally locked by means of screw-type jacks 38 against the plates 1 or 2 to be welded. Removal of the support is performed after the release of said jacks and the withdrawal of the bell-housing 21 by securing said support to plates 39 which are fixed against the internal sides of the frame 20 by means of screws 40. Only one plate 39 is shown in the drawing of FIG. 1 for the sake of enhanced simplicity and clearer understanding.

FIGS. 2 and 3 illustrate to a larger scale the constructional detail of the seals 23 and 24 which are mounted beneath the bottom surface of the enclosure frame 20 in order to ensure vacuum-tightness of the enclosure with respect to the plates 1 and 2 which are to be welded and against which said frame is intended to be applied. The seal 23 which is located outside the frame advantageously consists of two adjacent rings 23a and 23b respectively which are formed of relatively flexible material. Each ring has a transverse cross-section of polygonal shape such that a projecting portion directed towards the oppositely-facing bearing plate is capable of undergoing flattening by compression under the weight of the frame 20 and under the action of external pressure progressively as the enclosure is being evacuated. A lateral abutment shoulder 20a provided on the outside of the frame 20 limits the degree of compression of the rings 23a and 23b to an acceptable value. The second seal 24 serves to perfect the seal between the exterior and the interior of the enclosure since the flexible rings 23a and 23b alone do not achieve a sufficiently high degree of efficiency. To this end, the seal 24 is designed in the form of an inflatable element mounted within an open housing 41 which is provided beneath the bottom surface of the frame 20. Said seal 24 is connected by means of a duct 42 to an external source of inflating fluid which makes it possible, as illustrated in FIG. 3, to produce the expansion of the seal and application of this latter against the oppositely-facing plate, especially while absorbing the surface defects of said plate.

Finally, there is also illustrated to a larger scale in FIG. 4 the constructional detail of the feeler 16 which is associated with the welding head 4 together with its control unit 17 which makes it possible by reference to the line 18 followed by the feeler to rectify the position of the head in order to ensure displacement of said latter along the line of the seam weld S to be formed between the plates 1 and 2. In particular, the feeler 16 is mounted within a casing 43 between two contactors 44 and 45, the contacts 46 and 47 of which are actuated by the lateral displacements of said feeler. Said contactors 44 and 45 are thus intended to produce action on a control relay (not shown in the drawings) which initiates the rotation of a motor 49 in the appropriate direction. The threaded shaft 50 of said motor cooperates with a nut 51 which is stationarily fixed on an arm 52, said arm being mounted at the end of a fork 53 which in turn produces the transverse displacements of the welding head 4.

A welding device of improved design is thus provided in accordance with the arrangements described in the foregoing. The enclosure which surrounds the electron gun and in which the necessary degree of vacuum is created has dimensions which can be limited to reasonable values since it is placed on the parts to be welded and surrounds only that zone in which the weld fillet is to be formed. The design of the enclosure in the form of two separable elements also offers outstanding advantages. As explained earlier, it is thus possible to gain access to the electron gun and to its adjusting components without any need to disconnect all the electric supply leads and pumping ducts which remain fixed to the frame. The frame is placed on the parts and only the top bell-housing is removed. This accordingly results in greater ease of use and higher efficiency whilst positional adjustments and settings of the electron gun can be checked more readily and simply than in the case of designs which consist of a single-unit enclosure.

We claim:

1. A sealing device for a vacuum enclosure containing a movable support for an electron gun for electron-beam welding of two parts which are abuttingly applied against each other and on which the support and the enclosure rest, wherein said enclosure surrounds the electron gun support and is entirely independent of said support and includes a first element separable from a second element, said first element being a frame, seals on one face of said frame for vacuum-tightness upon application against the parts to be welded, another face of said frame being applied against a flange on said second element, said second element forming a bell-housing applied against said frame, the frame being a hollow structure having an internal surface directed towards the interior of the enclosure, orifices in said structure establishing communication with a duct for pumping the internal atmosphere when a primary vacuum is being created within said enclosure, said support being rigidly fixed to the frame by locking means released prior to the welding operation.

2. A device according to claim 1, wherein the frame of the vacuum enclosure includes grappling members for simultaneous handling of the enclosure and of the electron gun support.

3. A device according to claim 1, wherein said housing having a smooth internal surface.

4. A device according to claim 1, wherein pumping means for the electron gun produce a secondary vacuum within the electron gun, said pumpng means discharging into the enclosure and also into an evacuation conduit under primary vacuum and also into the external atmosphere.

5. A device according to claim 4, wherein the pumping means associated with the electron gun is a diffusion pump and also a turbomolecular pump and also a hybrid pump in which a turbomolecular pump cooperates with a screw-type Holweck pump.

6. A device according to claim 1, wherein the seals fitted in the surface of the frame include at least two concentric seals consisting of an outer seal formed of flexible material compressing under the weight of the vacuum enclosure and of an inflatable inner seal under low pressure bearing on the parts to be welded and compensating for surface defects of said parts.

7. A device according to claim 1, wherein a third face of said frame includes passageways for electrical leads and for fluids for supply and control of the electron gun and of other components within the enclosure.

* * * * *